United States Patent
Bhide et al.

(10) Patent No.: US 11,651,281 B2
(45) Date of Patent: May 16, 2023

(54) FEATURE CATALOG ENHANCEMENT THROUGH AUTOMATED FEATURE CORRELATION

(71) Applicant: International Business Machines Corporation, Armonk, NY (US)

(72) Inventors: Manish Anand Bhide, Hyderabad (IN); Jonathan Limburn, Southampton (GB); Harivansh Kumar, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 16/876,278

(22) Filed: May 18, 2020

(65) Prior Publication Data

US 2021/0357803 A1   Nov. 18, 2021

(51) Int. Cl.
G06N 20/00 (2019.01)
G06N 5/02 (2023.01)
G06N 5/04 (2023.01)

(52) U.S. Cl.
CPC ............ *G06N 20/00* (2019.01); *G06N 5/02* (2013.01); *G06N 5/04* (2013.01)

(58) Field of Classification Search
CPC ............ G06N 20/00; G06N 5/02; G06N 5/04
See application file for complete search history.

(56) References Cited

U.S. PATENT DOCUMENTS 8,370,280 B1 * 2/2013 Lin .................... G06N 5/04 706/12
9,218,574 B2 * 12/2015 Phillipps ............. G06N 20/20
10,445,170 B1 * 10/2019 Subramanian ......... G06N 7/005
2017/0330102 A1 * 11/2017 Brush .................... G06N 5/025
2018/0012143 A1 * 1/2018 Hansen ................. G06N 5/022
2018/0068220 A1   3/2018 Shao
2018/0173372 A1 * 6/2018 Greenspan .......... G06F 16/2465

(Continued)

FOREIGN PATENT DOCUMENTS

WO   WO-2013121224 A1 *  8/2013 ............. B82Y 15/00

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

Primary Examiner — Daxin Wu
(74) Attorney, Agent, or Firm — Richard B. Thomas

(57) ABSTRACT

Embodiments relate to a system, program product, and method for generating an enhanced feature catalog for a predictive model. The embodiments disclosed herein include capturing predictive model design time information including training data lineage metadata to determine the features of the training data, model design time measurements, and model design time metadata. Once the predictive model is built, the training data lineage metadata is used to capture the features that will be maintained within a feature catalog. The model design time measurements and model design time metadata provide further correlation between the predictive model and the features. Runtime metrics on the predictive model create additional correlations between the captured data and metadata with the features in the feature catalog to expeditiously identify the relevant features of the predictive model.

20 Claims, 9 Drawing Sheets

(56) References Cited

U.S. PATENT DOCUMENTS

| | | |
|---|---|---|
| 2019/0122136 A1 | 4/2019 | Dirac |
| 2019/0304603 A1 | 10/2019 | Takata |
| 2020/0134493 A1* | 4/2020 | Bhide .................. G06N 5/048 |
| 2020/0357060 A1* | 11/2020 | Dalinina .............. G06K 9/6232 |
| 2020/0372076 A1* | 11/2020 | Li ....................... G06F 11/3466 |
| 2021/0118024 A1* | 4/2021 | Sollami ................. G06F 17/18 |
| 2021/0174258 A1* | 6/2021 | Wenchel ............... G06N 20/00 |
| 2021/0241152 A1* | 8/2021 | Fong .................... G06N 20/00 |
| 2021/0342707 A1* | 11/2021 | Xu ........................ G06N 20/20 |
| 2021/0365813 A1* | 11/2021 | Nakano ................. G06N 20/00 |

\* cited by examiner

FEATURE CATALOG ENHANCEMENT THROUGH AUTOMATED FEATURE CORRELATION

BACKGROUND

The present disclosure relates to generating an enhanced feature catalog for a predictive model, and, more specifically, for capturing training data lineage metadata to determine the features of the training data, and using model design time measurements, model design time metadata, and runtime metrics associated with the predictive model, and correlating the captured data and metadata with the features in the feature catalog to expeditiously identify the relevant features of the predictive model.

Many known machine learning (ML) applications, including those embedded in broader artificial intelligence (AI) platforms as well as those defining stand-alone ML systems, use one or more learning algorithms to solve problems and make predictions of queried outcomes based on a mathematical model generated through ingestion and analyses of training data. Once the model is created, it is tested and further analyzed to distinguish the features created in the model from the ingested data that are most relevant to arriving at the proper outcomes from the model.

SUMMARY

A system, computer program product, and method are provided for generating an enhanced feature catalog for a predictive model, and, more specifically, for capturing training data lineage metadata to determine the features of the training data, and using model design time measurements, model design time metadata, and runtime metrics associated with the predictive model, and correlating the captured data and metadata with the features in the feature catalog to expeditiously identify the relevant features of the predictive model.

In one aspect, a computer system for generating an enhanced feature catalog for a predictive model, and expeditiously identifying the relevant features of the predictive model is provided. The system includes a processing device and a memory device operably coupled to the processing device. The system also includes a data storage system communicatively coupled to the processing device and the memory device. The data storage system is configured to retain a training data repository, and the training data repository is configured to maintain training data therein. The processing device is configured to implement a modeler that is configured to build a predictive model from at least a portion of the training data defined as predictive model training data. The processing device is further configured to capture lineage metadata for the predictive model training data and identify, subject to the capture, a plurality of features collected from the predictive model training data. The processing device is also configured to populate a feature catalog with the identified plurality of features and execute one or more analyses on the predictive model to capture one or more predictive model runtime measurements. Moreover, the processing device is configured to determine, subject to the one or more analyses, one or more features of the plurality of features to remain within the feature catalog.

In another aspect, a computer program product for generating an enhanced feature catalog for a predictive model, and expeditiously identifying the relevant features of the predictive model is provided. The computer program product includes one or more computer readable storage media and program instructions collectively stored on the one or more computer-readable storage media. The program instructions include program instructions to build a predictive model from at least a portion of training data from a training data repository, the at least a portion of the training data being predictive model training data. The computer program product also includes program instructions to capture lineage metadata for the predictive model training data and identify, subject to the capture, a plurality of features collected from the predictive model training data. The computer program product further includes program instructions to populate a feature catalog with the identified plurality of features and execute one or more analyses on the predictive model to capture one or more predictive model runtime measurements. The computer program product also includes program instructions to determine, subject to the one or more analyses, one or more features of the plurality of features to remain within the feature catalog.

In yet another aspect, a computer-implemented method for generating an enhanced feature catalog for a predictive model, and expeditiously identifying the relevant features of the predictive model is provided. The method includes building a predictive model from at least a portion of training data from a training data repository, the at least a portion of the training data being predictive model training data. The method also includes capturing lineage metadata for the predictive model training data and identifying, subject to the capture, a plurality of features collected from the predictive model training data. The method further includes populating a feature catalog with the identified plurality of features and executing one or more analyses on the predictive model to capture one or more predictive model runtime measurements. The method also includes determining, subject to the one or more analyses, one or more features of the plurality of features to remain within the feature catalog.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
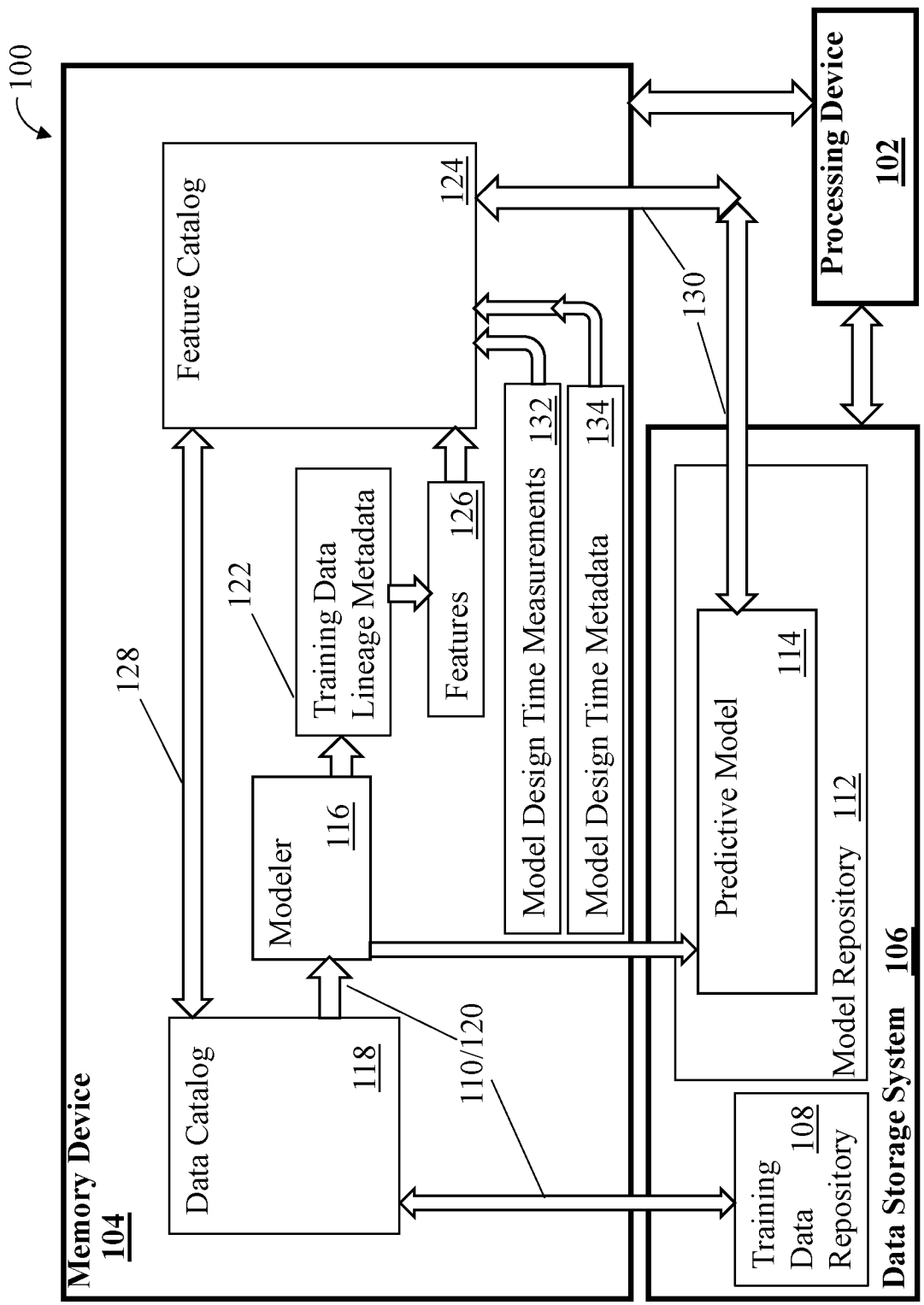
FIG. 1 is a schematic diagram illustrating a computing environment suitable for generating an enhanced feature catalog for a predictive model and preparing the feature catalog for further analyses, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known machine learning (ML) applications, including those embedded in artificial intelligence (AI) platforms as well as those defining stand-alone ML systems, use one or more learning algorithms to solve problems and make predictions of queried outcomes based on a mathematical model generated through ingestion and analyses of training data. Once the model is created, it is tested and further analyzed to distinguish the features created in the model from the ingested data that are most relevant to arriving at the proper outcomes from the model. In at least some known instances of model generation, a feature catalog is used to capture the features of the model that are related to the data used to create the model. However, many of these known feature catalogs reference only the metadata of the data used to build the model, thereby requiring significant research and analyses to determine the relevant features associated with the model directed toward generating proper, well-formed predictions and solutions and distinguish those relevant features from less relevant and irrelevant features. Therefore, any distinct relationship between the features and the data used to generate the model to identify the relevant features needs to be determined. Accordingly, such determination of the relevant features may require an extended period of time (sometimes measured in months) to analyze the ingested data (sometimes measured in terabytes).

A system, computer program product, and method are disclosed and described herein for generating an enhanced feature catalog for a predictive model, and, more specifically, for capturing training data lineage metadata to determine the features of the training data. In addition, the system, computer program product, and method use model design time measurements, model design time metadata, and runtime metrics associated with the predictive model, and correlate the captured data and metadata with the features in the feature catalog to expeditiously identify the relevant features of the predictive model.

The embodiments disclosed herein facilitate automating the process of determining the relevant features for a predictive model that are shown to reliably provide predictions of outcomes consistent with actual predetermined outcomes. A training data repository is populated with data intended to be used to train the predictive model to be built. A predictive model is built from the training data. In at least some embodiments, the lineage of the training data used to build the predictive model is captured during the building and training of the predictive model. In some embodiments, the lineage of the training data is captured after the building of the model. In some embodiments, data lineage is a data life cycle that includes the data's origins and where it moves over time. Also, in some embodiments, the data lineage describes what happens to data as it goes through diverse processes, including, without limitation, building models. Further, in some embodiments, the data lineage facilitates providing visibility into the analytics pipeline and simplifies tracing errors, or other issues, back to their sources. Regardless of when the lineage data is captured, it is primarily captured through capturing the metadata associated with the training data. Capturing the lineage of the training data facilitates identifying the portions of the training data from the repository used to build the predictive model. As used herein, the term "predictive model training data" refers to the subset of the inventory of data in the training data repository used to train the predictive model. The respective metadata associated with the training data is captured with the training data through a data catalog. Accordingly, capturing the metadata of the predictive model training data facilitates the subsequent analyses to capture the features of the data most likely to provide reliable predictions of outcomes.

The metadata associated with the predictive model training data facilitates identifying the various features used to build the model. In general, and as described more thoroughly herein, the features of the predictive model as culled from the associated training data represent categories of the data, for example, and without limitation, vehicular make, model, and year, gender, annual income, height, weight, etc. A feature catalog is generated by the modeling platform and the feature catalog is populated with the identified features. Initially, in at least some embodiments, all features identified within the predictive model are, at least temporarily, stored in the feature catalog, where the predictive model training data lineage metadata is used to push the identified features into the feature catalog. In some embodiments, one or more filters are used to execute a preliminary screen of the features to define a threshold value for number of instances and/or frequency of instances of the features appearing in the predictive model training data that are permitted to populate the feature catalog. The captured predictive model training data lineage metadata is correlated to the features that are culled therefrom. Accordingly, a feature catalog is populated with the features embedded within the predictive model training data and the metadata is correlated with the respective features.

In at least some embodiments, predictive model design time measurements are captured during the model creation and training activities. Such design time measurements include metrics of the data used to construct and train the model such as, without limitation, accuracy, precision, recall, bias, and drift. In the respective embodiments, these design time metrics are correlated to the respective features which were culled from the respective data to build the model. Accordingly, data metrics are used to assign quality metrics to the features.

Also, in at least some embodiments, predictive model design time metadata is captured. Such design time metadata includes, without limitation, the framework used to build the model with the respective features (such as, and without limitation, classification (e.g., a gradient boosted classifier and support vector machine (SVM)), similarity, and clustering frameworks), and the kind of cross-validation performed on the model. The captured design time metadata is correlated to the respective features such that at least a portion of the features will be related to information such as, and without limitation, the framework and algorithms typically used to build predictive models with certain features. Such correlation may be used to assist data scientists to more expeditiously, and confidently, build the desired predictive models. Accordingly, the design phase activities, including, without limitation, data inputting, model building, model training, training data metadata collection, features identification, and metrics and metadata collection are used to build and train the predictive model while collecting information to facilitate further data collection once the predictive model is placed into production.

Once the predictive model is deemed ready, the model is placed into production such that the data scientists may execute runtime analyses on the predictive model to capture predictive model runtime measurements. The respective metrics are computed and collected as a function of the model behavior either at model validation time or after the model has been deployed to production. Specifically, the predictive model is used to generate predictions according to the purpose and training of the predictive model. In at least some embodiments, there is a variety of runtime analyses that may be used to monitor and evaluate the performance of the predictive model while it in in production. Once the model has been deployed to production, periodic analyses on the predictive model are performed to measure model quality such as, and without limitation, concept drift, model decay, and prediction correlations to key performance indicators. Data collected from these runtime analyses is typically in the form of metadata that will be fed-back to the features in the feature catalog, which was populated during, or subsequent to, the building of the model. Many of the runtime analyses will be designed for the particular model being tested and the appropriate metrics will be extracted. In some embodiments, the features of the model that are populating the feature catalog are correlated with the predictions generated by the predictive model. For example, and without limitation, once one or more correlations of the features with the model predictions are identified, further insight as to what kind of role the features actually play within the model may be gleaned. Accordingly, an impact of each feature on the predictive model's predictions for different portions of the data domain of the predictive model training data are determined with the intention of subsequently ranking the features at least partially as a function of the measured impacts, as discussed further herein.

In at least some embodiments, one or more runtime analyses directed at identifying the features associated with the predictive model that tend to introduce indirect biases in the predictive model are performed. In one or more embodiments, it may be determined that a particular feature being evaluated is not being used in the model, but is correlated to some other feature or features which are used in the model and tend to direct the model to perform in a biased manner. Accordingly, features that introduce biases in the model may be removed, or, alternatively, the model may be calibrated to substantially negate such biases.

Also, in some embodiments, relationships between the determined features are captured and overlapping features and gaps between the features are determined. The correlations between different features which are present in the model are determined and each of the respective feature-to-feature correlations is identified as a particular relationship between the features. For example, and without limitation, these feature-to-feature correlations are captured at runtime using tools such as, and without limitation, principle component analysis. Accordingly, any respective features that are determined to be playing a complimentary role in the model predictions may be evaluated to be removed from the feature catalog.

Further, in some embodiments, one or more accuracy measurements of the predictive model are performed at runtime. The predictions made by the model may be compared to prepared predictions to determine the accuracy of the model with respect to its predictive capabilities and features. The accuracy measurements may be correlated with one or more particular features of the model. Accordingly, information of the level of accuracy that is achieved by using the respective feature or features is captured and a decision may be made with respect to keeping the feature in the feature catalog and/or potentially looking for one or more other features that may perform better.

Once the runtime analyses are completed, the features that are to remain in the feature catalog are determined based on the analyses. In general, there may be hundreds or thousands of features determined from the training data metadata. The runtime analyses as described herein are configured to reduce the number of features in the feature catalog to those features that have the most pronounced effects or impacts on the predictions generated by the model. In one or more embodiments, the remaining features may be used to generate a global explanation of the predictive model that will identify the importance of each feature with respect to the respective impact on the model prediction for different portions of the training data domain.

In some embodiments, the determination as to which features will be retained within the feature catalog includes the following operations. The predictive model runtime measurements as described above are fed-back to the features in the feature catalog and the measurements are correlated to the features. A runtime quality score for each feature is determined based on the respective predictive model runtime measurements. For example, and without limitation, a feature which has a strong correlation to the respective model prediction will have a higher score. The weaker the correlation, the lower the score, which may be indicative of an indirect bias. The weakest correlations and associated lower scores may be indicative of the respective feature or features being subsumed by some other feature or features. Those features that are retained within the feature catalog will be those features with a runtime quality scores meeting or exceeding a predetermined threshold value. Accordingly, metrics collected during runtime measurements and analyses are used to determine a runtime quality score that is employed to identify those features with the strongest correlations to the predictions generated by the model meeting or exceeding expectations for accuracy.

Referring to FIG. 1, a schematic diagram is provided illustrating a computing environment, i.e., a computer system 100 suitable for generating a feature catalog for a predictive model and preparing the feature catalog for further analyses as described herein. Specifically, computer system 100 is configured to capture training data lineage metadata associated with building a predictive model to determine the features of training data. The computer system 100 is configured to use model design time measurements, model design time metadata, and runtime metrics associated with the predictive model, and correlate the captured data and metadata with the features in the feature catalog to expeditiously identify the relevant features of the predictive model.

The computer system 100 includes a processing device 102 and a memory device 104, where the memory device 104 is operably coupled to the processing device 102. The computer system 100 further includes a data storage system 106 communicatively coupled to the processing device 102 and the memory device 104. The data storage system 106 is configured with sufficient storage capabilities to enable operation of the computer system 100 as described herein. In addition, the data storage system 106 is any type of storage and any platform that enables operation of the computer system 100 as described herein. The data storage system 106 is configured to retain a training data repository 108 that is configured to maintain training data therein. The training data repository 108 is configured to store data through any type of database that enables operation of the computer system 100 as described herein, including, without limitation, relational databases, flat databases, and spreadsheets. The stored data includes, without limitation, training data for models to be built through the processes described herein, the testing data for the models (typically, the same data as the training data), and the metadata associated with the training data. The data storage system 106 is further configured to retain a model repository 112 that is configured to store one or more predictive models 114 therein. Accordingly, the computer system 100 includes a processing device 102, memory device 104, and data storage system 106, where the processing device 102, memory device 104, and data storage system 106 are communicatively coupled to each other, and the data storage system 106 includes a training data repository 108 and model repository 112 resident therein.

The computer system 100 also includes a modeler 116 resident within the memory device 104 and configured to build the predictive model 114 from at least a portion of the training data resident within the training data repository 108, where the portion of the training data used to train the predictive model 114 is referred to as the predictive model training data 110. The modeler 116 is any modeling and machine learning (ML) platform that enables operation of the computer system as described herein, including, without limitation, artificial intelligence (AI) platforms as well as those platforms as defined by stand-alone ML systems. The modeler 116 includes a plurality of instructions stored in the memory device 104 that are implemented by the processing device 102. In the embodiments illustrated herein, at least some of the items depicted as being resident in the memory device 104 and/or the data storage system 106 are instructions, that when executed by the processing device 102, provide the functionality described, including, for example, and without limitation, the predictive model 114 and the modeler 116.

In at least some embodiments, the computer system 100 includes a data catalog 118 resident within the memory device 104. The data catalog 118 is configured as a window into the training data repository 108 that facilitates access to the training data repository 108 by the modeler 116. The data catalog is not dedicated to building any particular predictive model 114. Specifically, the data catalog does not contain the predictive model training data 110, but instead, includes a plurality of pointers to the respective data in the training data repository 108 that facilitate communication of the predictive model training data 110 to the modeler 116. In addition to the data, the data catalog 118 includes pointers directed to the metadata 120 associated with the respective predictive model training data 110, e.g., including training data lineage metadata 122 that is discussed further herein. In operation, the data catalog 118 points to the predictive model training data 110 and metadata 120 associated with the predictive model training data 110 during the building and training of the predictive model 114 and at least portions of the same predictive model training data 110 and metadata 120 during the testing/validation phase of the model 114 once it is placed into production.

Further, in at least some embodiments, the computer system 100 includes a feature catalog 124 resident within the memory device 104. The feature catalog 124 is configured to maintain resident therein the features 126 determined from the training data lineage metadata 122 as described further herein. In a manner similar to the data catalog 118, the feature catalog 124 does not include any data or metadata resident therein, but rather includes pointers to the training data lineage metadata 122 through the data catalog 118 (as shown by arrow 128) and the respective features 126 as embedded within the predictive model 114 (as shown by arrows 130). As such, the feature catalog 124 is communicatively coupled to the data catalog 118 and the respective predictive model 114. Therefore, the feature catalog 124 acts as a window into the training data repository 108 through the data catalog 118 and as a window into the respective predictive model 114. Also, similar to the data catalog 118, the feature catalog 124 is not dedicated to any one predictive model 114 and may maintain features associated with a plurality of predictive models 114. The version of the features 126 resident within the feature catalog 124 as created through the training data lineage metadata 122 may be modified through data input including, and without limitation, model design time measurements 132 and model design time metadata 134, both as discussed further herein. Accordingly, the feature catalog includes information that provides details of how to build, train, and place into production a model similar to the predictive model 114 more expediently and efficiently than would otherwise typically be observed.

Figure 2:
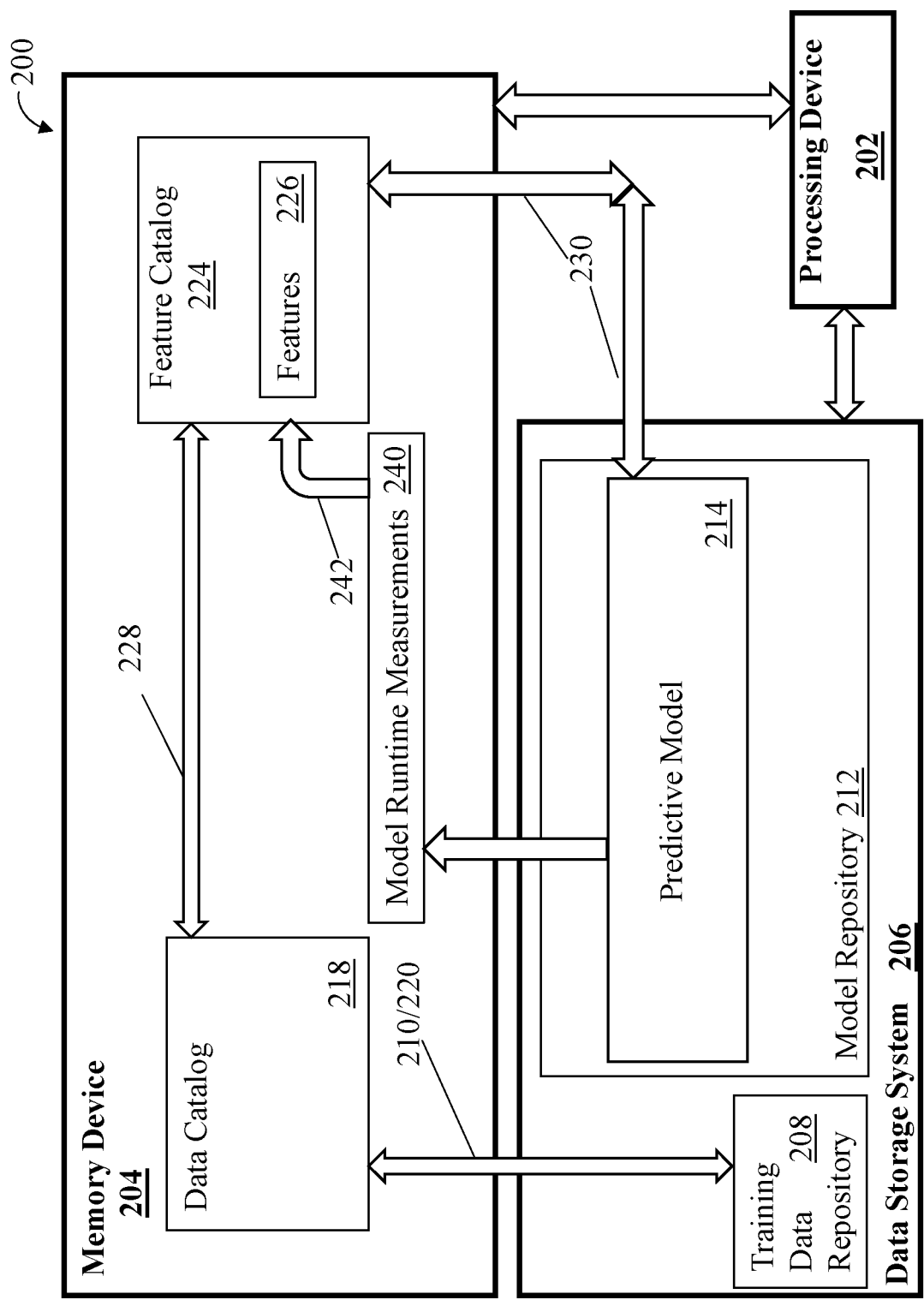
FIG. 2 is a schematic diagram illustrating the computing environment of FIG. 1 suitable for expeditiously identifying the relevant features of the predictive model, in accordance with some embodiments of the present disclosure.

Referring to FIG. 2, a schematic diagram illustrating the computing environment, i.e., the computer system 200 suitable for expeditiously identifying the relevant features 226 of the predictive model 214. The computer system 200 is substantially similar to the computer system 100 shown in FIG. 1 with some features only required for the design time activities not shown in FIG. 2 for clarity, and those features required for runtime with the predictive model 214 in production shown in FIG. 1. In at least some embodiments, predictive model runtime measurements 240 are collected with the predictive model 214 in production. These predictive model runtime measurements 240 are fed-back to the features catalog as feed-back 242 to cooperate with the model design time measurements 132 and model design time metadata 134 (both shown in FIG. 1) to further define, modify, or update, the features 226 resident within the feature catalog 224. Accordingly, the features 226 are shown resident within the feature catalog 224, where the features 226 are subject to a reduction in number, ranking, and continued updating of the correlations between the data fed into the predictive model 214 and the evolution of the model over time.

Figure 3:
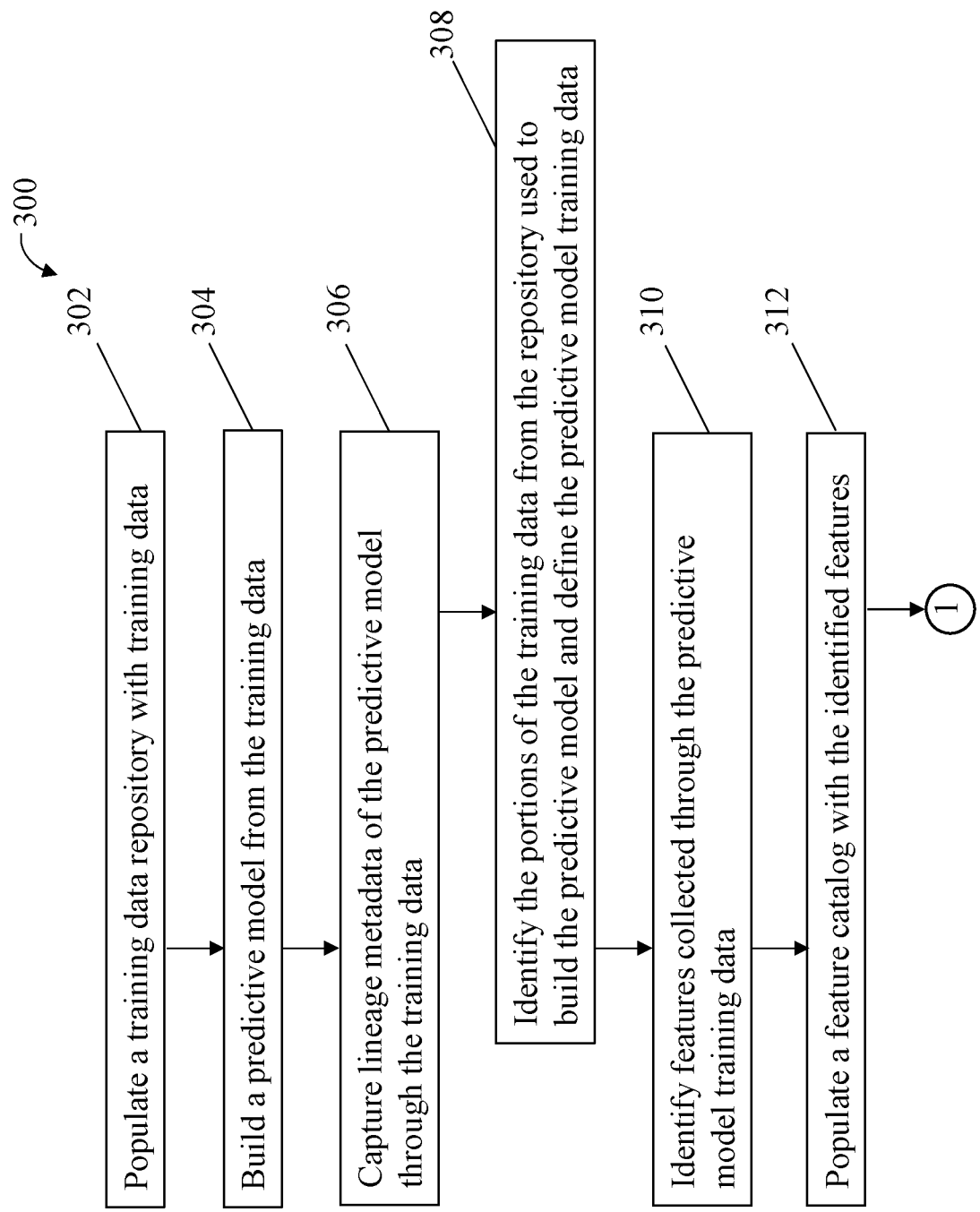
FIG. 3 is a flow chart illustrating a process for creating a predictive model and populating a feature catalog, in accordance with some embodiments of the present disclosure.
Figure 3:
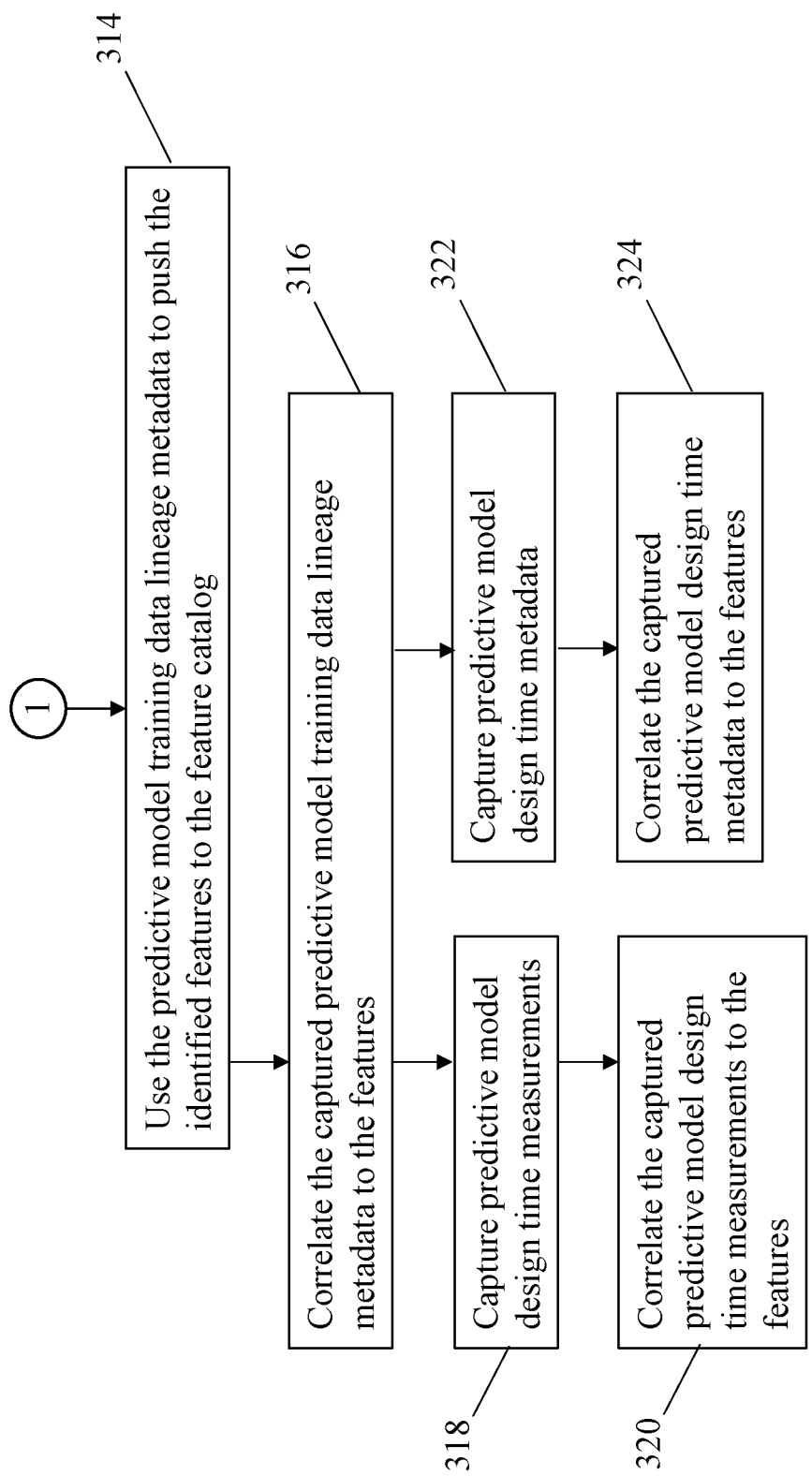

Referring to FIG. 3, a flow chart is provided illustrating a process 300 for creating the predictive model 114 and populating the feature catalog 124. Referring to FIGS. 1 and 3, in at least some embodiments, the design time activities for building the predictive model 114 include populating 302 the training data repository 108 with data intended to train the predictive model 114. The predictive model 114 is built 304 from the predictive model training data 110. In at least some embodiments, the lineage of the predictive model training data 110 used to build the predictive model 114 is captured 306 during the building and training of the predictive model 114, and is identified as the training data lineage metadata 122. The training data lineage metadata 122 includes, without limitation, any dates associated with the respective data, any labels associated with the respective data established through the model training, column, row, and table identifiers, original source of the data, and any respective linking or joining features. In some embodiments, the lineage metadata 122 of the predictive model training data 110 is captured 306 after the building of the model 114. Capturing 306 the training data lineage metadata 122 of the predictive model training data 110 facilitates identifying 308 the portions of the training data from the training data repository 108 used to build the predictive model 114, i.e., the predictive model training data 110 that is a subset of the inventory of data in the training data repository 108 used to train the predictive model 114. The respective training data lineage metadata 122 is captured 306 with the predictive model training data 110 through the data catalog 118. Accordingly, capturing the training data lineage metadata 122 of the predictive model training data 110 facilitates the subsequent analyses to capture the features of the data most likely to provide reliable predictions of outcomes.

The training data lineage metadata 122 associated with the predictive model training data 110 facilitates identifying 310 the various features 126 of the predictive model 114. Specifically, the training data lineage metadata 122 associated with the predictive model training data 110 is collected and analyzed to identify the features within the predictive model training data 110 that are inherently passed on to the predictive model 114. In at least one embodiment, the features 126 are any characteristics of the data that are inherited by the predictive model 114 through the training of the predictive model 114, where those characteristics are discoverable through the training data lineage metadata 122.

In at least some embodiments, the feature catalog 124 is created by the modeling platform and the feature catalog 124 is populated 312 with the identified features 126. Initially, in at least some embodiments, all features 126 identified within the predictive model 114 are, at least temporarily, stored in the feature catalog 124 through using the training data lineage metadata 122 to push 314 the identified features 126 to the feature catalog 124. In some embodiments, one or more filters are used to execute a preliminary screen of the features 126 to define a threshold value for number of instances and/or frequency of instances of the features 126 appearing in the predictive model training data 110 that are permitted to populate the feature catalog 124. The captured training data lineage metadata 122 is correlated 316 to the features 126 that are culled therefrom. Accordingly, the feature catalog 124 is populated with the features 126 embedded within the predictive model training data 110 and the respective training data lineage metadata 122 is correlated with the respective features 126.

Further, in at least some embodiments, predictive model design time measurements 132 are captured 318 during the model building 304 and training operations. Such predictive model design time measurements 132 include metrics of the data used to build 304 and train the predictive model 114 such as, without limitation, accuracy, precision, recall, bias, and drift. In the respective embodiments, these predictive model design time measurements 132 are correlated 320 to the respective features 126 which were culled from the predictive model training data 110 to build the predictive model 114. Accordingly, data metrics are used to assign quality metrics to the features 126 as discussed further herein.

Also, in at least some embodiments, the predictive model design time metadata 134 is captured 322. Such predictive model design time metadata 134 includes, without limitation, the framework used to build the predictive model 114 with the respective features 126 (such as, and without limitation, classification (e.g., a gradient boosted classifier and support vector machine (SVM)), similarity, and clustering frameworks), and the type of cross-validation performed on the predictive model 114. The captured predictive model design time metadata 134 is correlated to the respective features 126 such that at least a portion of the features 126 will be related to information such as, and without limitation, the framework and algorithms typically used to build predictive models with certain features. Such correlation may be used to assist data scientists to more expeditiously, and confidently, build the desired predictive models. The aforementioned collection of data, metadata, analyses, and metrics is not exhaustive and any information that enhances determining the relevant features that are most determinative of particular outcomes is used. Accordingly, the design phase activities, including, without limitation, data inputting, model building, model training, training data metadata collection, features identification, and metrics and metadata collection are used to build and train the predictive model while collecting information to facilitate further data collection once the predictive model is placed into production.

Figure 4:
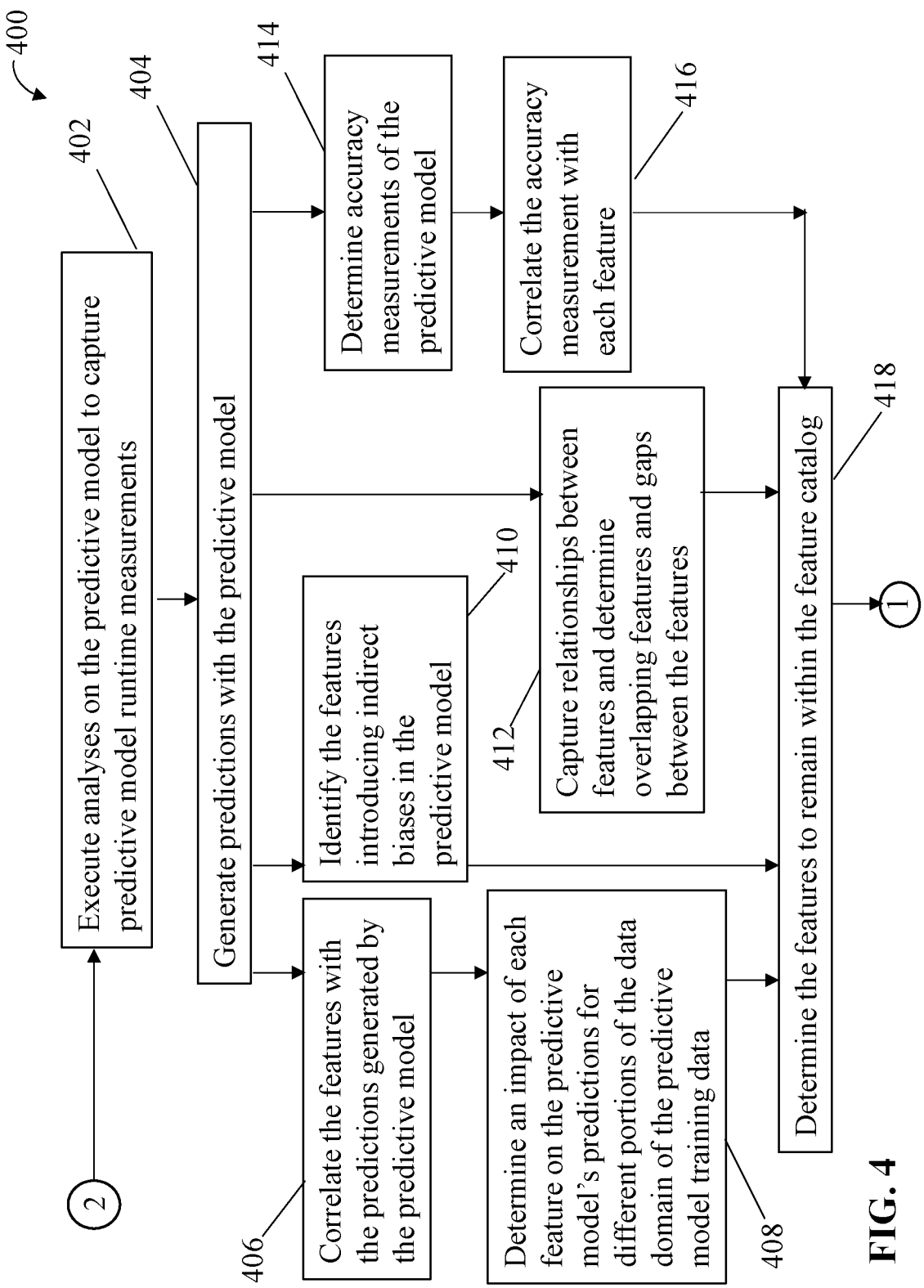
FIG. 4 is a flow chart illustrating a process for expeditiously identifying the relevant features of the predictive model, in accordance with some embodiments of the present disclosure.
Figure 4:
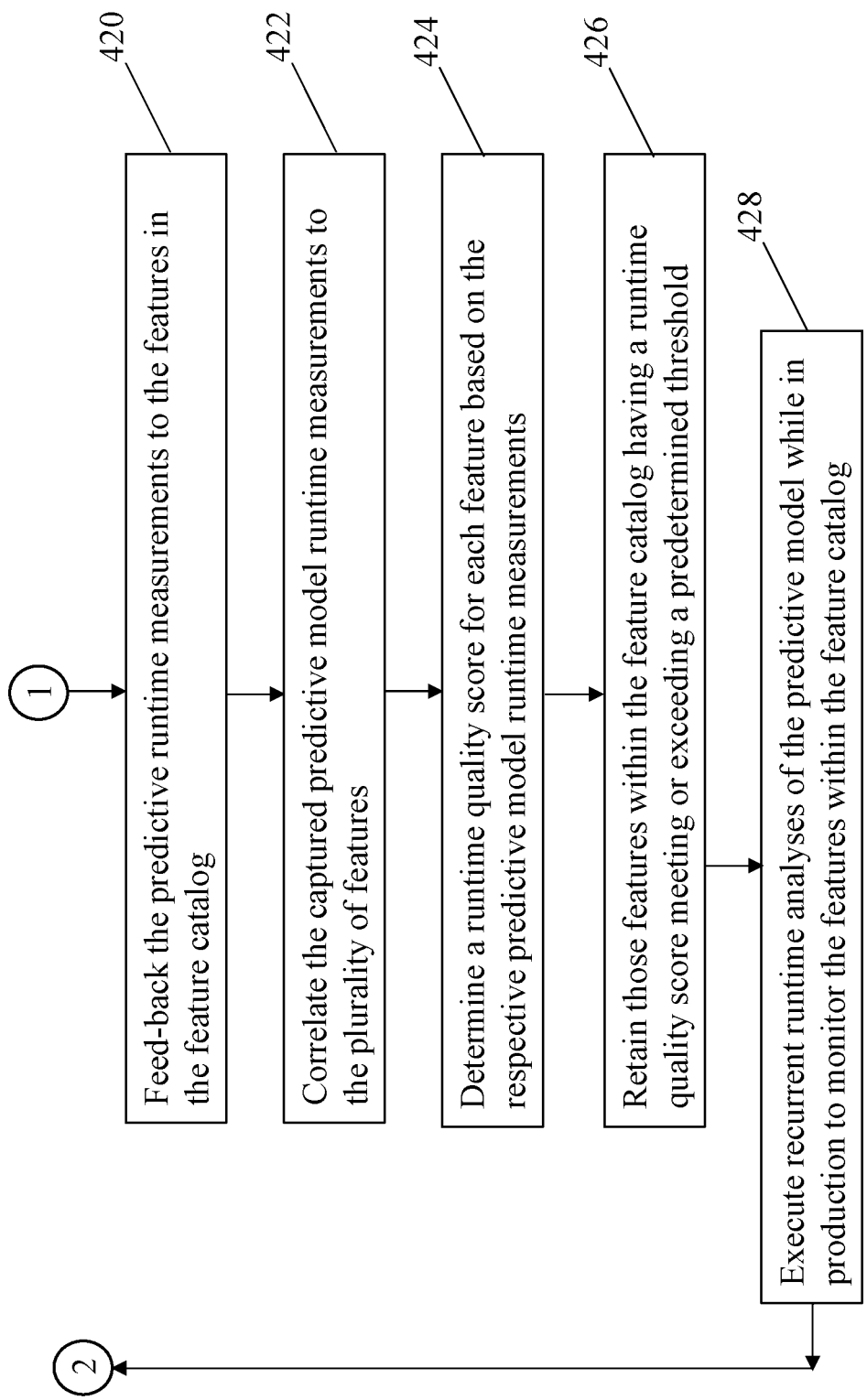

Referring to FIG. 4, a flow chart is provided illustrating a process 400 for expeditiously identifying the relevant features 226 of the predictive model 214. Referring to FIGS. 2 and 4, in at least some embodiments, the production, i.e., runtime activities are employed to provide further analyses of the captured features 226. Once the predictive model 214 is deemed ready for production, the predictive model 214 is placed into production such that the data scientists may execute 402 runtime analyses on the predictive model 214 to capture predictive model runtime measurements 240. In some embodiments, the respective metrics are computed and collected as a function of the behavior of the predictive model 214 either at model validation time or after the predictive model 214 has been deployed to production. Specifically, the predictive model 214 is used to generate 404 predictions according to the purpose and training of the predictive model 214.

In at least some embodiments, there is a variety of runtime analyses that may be used to monitor and evaluate the runtime performance of the predictive model 214 while it in in production. Once the predictive model 214 has been deployed to production, periodic analyses on the predictive model 214 are performed to measure model quality such as, and without limitation, concept drift, model decay, and prediction correlations to key performance indicators. Data collected from these runtime analyses is typically in the form of metadata that will be fed-back to the features 226 in the feature catalog 224 which was populated during, or subsequent to, the building of the predictive model 214. Many of the runtime analyses will be designed for the particular model being tested and the appropriate metrics will be extracted. In some embodiments, the features 226 of the predictive model 214 that are populating the feature catalog 224 are correlated 406 with the predictions generated by the predictive model 214. For example, and without limitation, once one or more correlations of the features with the model predictions are identified, further insight as to what kind of role the features actually play within the model may be gleaned. Accordingly, an impact of each feature 226 on the predictive model's 214 predictions for different portions of the data domain of the predictive model training data 210 are determined 408 with the intention of subsequently ranking the features 226 at least partially as a function of the measured impacts, as discussed further herein.

Moreover, in at least some embodiments, one or more runtime analyses directed at identifying 410 those features of the features 226 associated with the predictive model 214 that tend to introduce indirect biases in the predictive model 214 are executed. In one or more embodiments, it may be determined that a particular feature being evaluated is not being used in the predictive model 214, but is correlated to some other feature or features which are used in the predictive model 214 and tend to direct the predictive model 214 to perform in a biased manner. Accordingly, features 226 that introduce biases in the predictive model 214 may be removed, or, alternatively, the predictive model 214 may be calibrated to substantially negate such biases.

Also, in some embodiments, relationships between the determined features 226 are captured 412 and overlapping features 226 and gaps between the features 226 are determined. The correlations between different features 226 which are present in the predictive model 214 are determined and each of the respective feature-to-feature correlations is identified as a particular relationship between the features 226. For example, and without limitation, these feature-to-feature correlations are captured at runtime using tools such as, and without limitation, principle component analysis. Accordingly, any respective features 226 that are determined to be playing a complimentary role in the model predictions may be evaluated to be removed from the feature catalog 224.

Further, in some embodiments, one or more accuracy measurements of the predictive model 214 are performed 414 at runtime. The predictions made by the predictive model 214 may be compared to prepared predictions to determine the accuracy of the predictive model 214 with respect to its predictive capabilities and features. The accuracy measurements may be correlated 416 with one or more particular features 226 of the predictive model 214. Accordingly, information of the level of accuracy that is achieved by using the respective feature or features 226 is captured and a decision may be made with respect to keeping the feature 226 in the feature catalog 224 and/or potentially looking for one or more other features 226 that may perform better.

Moreover, in some embodiments, once the aforementioned runtime analyses are completed, the features 226 that are to remain in the feature catalog 224 are determined 418 based on the analyses. In general, there may be hundreds or thousands of features 226 determined from the training data lineage metadata 122. The runtime analyses as described herein are configured to reduce the number of features 226 in the feature catalog 224 to those features 226 that have the most pronounced effects or impacts on the predictions generated by the predictive model 214. In one or more embodiments, the remaining features 226 may be used to generate a global explanation of the predictive model 214 that will identify the importance of each feature 226 with respect to the respective impact on the model prediction for different portions of the training data domain.

In some embodiments, the determination as to which features 226 will be retained within the feature catalog 224 includes one or more of the following operations. The predictive model runtime measurements as described above are fed-back 420 to the features 226 in the feature catalog 224 and the measurements are correlated 422 to the features 226. A runtime quality score for each feature 226 is determined 424 based on the respective predictive model runtime measurements. For example, and without limitation, a feature 226 which has a strong correlation to the respective model prediction will have a higher score. The weaker the correlation, the lower the score, which may be indicative of an indirect bias. The weakest correlations and associated lower scores may be indicative of the respective feature or features 226 being subsumed by some other feature or features 226. Those features 226 that are retained 426 within the feature catalog 224 will be those features 226 with a runtime quality scores meeting or exceeding a predetermined threshold value. Accordingly, metrics collected during runtime measurements and analyses are used to determine a runtime quality score that is employed to identify those features 226 with the strongest correlations to the predictions generated by the predictive model 214 meeting or exceeding expectations for accuracy.

In at least some embodiments, the computer system 200 executes 428 recurrent runtime analyses of the predictive model 214 while in production to monitor the features 226 within the feature catalog 224. In some embodiments, the recurrent runtime analyses are performed continuously. Also, in some embodiments, the recurrent runtime analyses are performed on a predetermined schedule. Further, in at least some embodiments, analyses in addition to the analyses shown and discussed in relation to FIG. 4 are performed. Moreover, in some embodiments, selected analyses as shown and discussed in relation to FIG. 4 are selected to not be performed. The recurrent monitoring operation 428 includes execution of the bias identification operations 410 to, for example, and without limitation, maintain a vigilance directed toward reducing a potential for unexpected biased predictions and decisions. In at least some embodiments, the runtime metrics recorded are fed-back 420 to the features 226 in the feature catalog 224 to update or modify the runtime quality scores of the features 226 and record additional information related to the performance of the predictive model 214. In some of those embodiments, subsequent operation of the computer system 200 with the additional information captured through execution of the recurrent monitoring operation 428 may result in continuous or periodic modifications to the computer system 200. Accordingly, the computer system 200 includes features to maintain the proper operation of the predictive model 214 through production monitoring and collection of runtime metrics.

Referring to FIGS. 1-4, one example embodiment of the operation of the computer system 100/200 as described herein includes a predictive model for a loan application, where the loan application predictive model is substantially similar to the predictive model 114/214 as described herein. The information and data for such historical loan applications may be maintained in a plurality of data sources, such as, and without limitation, databases and spreadsheets. The historical loan application information included in the databases and spreadsheets is used to execute the populating operation 302 of the training data repository 108/208. In at least one embodiment, no preliminary review of the input data is performed, and the data from the aforementioned data sources is entered without abridgement. Such information may include, without limitation, applicant information such as age, gender, residential and occupational addresses, social security number, medical details, and financial history. The historical loan application data is extracted and linked in the training data repository 108/208.

As the collected data is used to build 304 the predictive model, the lineage of the data as reflected in the training data lineage metadata 122 is used to identify 310 the features 126 of the data used to build the predictive model 114/214. These features 126 are inherited by the predictive model 114/214 and populate 312 the feature catalog 124/224. These features 126 and the respective training data lineage metadata 122 are correlated 316. Once the predictive model 114/214 is placed into production, the runtime analyses as described herein are executed 402 while predictions of loan grants and denials are generated 404 using the training data as the testing data. In order to determine 418 the features 126/226 that will remain in the feature catalog 124/224, the respective runtime quality scores for each feature 126/226 are determined 424. In the present example embodiment, those features 126/226 with runtime quality scores at or above a specified threshold will be retained 426 in the feature catalog while those features 126/226 with runtime quality scores below the established threshold are removed. In some embodiments, the threshold is established by the operators of the computer system 100/200, while in some embodiments, the threshold is established by the computer system 100/200 based on the runtime operations to generate predictions.

In the present embodiment, the purpose of the predictive model 114/224 is to predict grants and denials of loan applications based on previous grants and denials. Based on such history, the predictive model 114/224 may determine that social security numbers have little impact on the grant/denial decisions, however, salary history and financial history data is overwhelmingly determinative of the decision as to whether grant the loan application or not. Therefore, in the present example embodiment, the features of salary history and financial history are retained in the feature catalog 124/224 and the social security number feature is removed from the feature catalog 124/224. Therefore, the patterns established by the predictive model 114/214 as to those features 126/226 that are most useful in predicting the grant/denial outcomes in practice are preserved for the operators of the computer system 100/200 to build similar models, or replicate the present model, without the extended testing and analysis to determine those features. In addition, wholesale intake of data as described for the present example embodiment is not necessary since it has been determined based on the retained features the subset of the data that is most useful in generated accurate predictions of grant or denial. Moreover, such determination of the more relevant features may be extended to determine those features, based on the influence of the features analyzed on particular model predictions and real-world decisions, that should be considered for future model building, or to enhance other existing models that were placed into production without the benefits of the systems and operations described herein.

Further, in the example embodiment, as the model 114/214 is in production performing runtime determinations of loan grants and denials, the executing 428 of recurrent runtime analyses facilitates evaluations by the operators of the computer system 100/200 as to whether the predictive model 114/214 is making proper and correct decisions. For example, for many loan application embodiments, age and gender may not be retained as relevant features for determined whether to grant or deny a loan application. As the runtime metrics are collected, information with respect to the features being used to make the decisions may indicate that the features of the model are introducing a bias with respect to those features such that less relevant features, e.g., age and gender, may potentially affect loan application grants and denials based on the bias. As such, corrective actions may be taken as soon as such a bias is determined. In addition, such characteristics of the computer system 100/200 facilitates creating auditable records of issues raised and corrective actions taken to respond to inquiries, such as why a particular load application was denied. Accordingly, one a model is placed into production, the model may be guarded from degradation such as drift and bias.

Accordingly, the computer systems 100/200, including the model features determinations, rankings, and management as described herein, improves the known art of building and validating machine learning models through automatically determining the relevant features for generating predictions and decisions through the models, and significantly reduces the time and effort necessary to determine such relevant features.

Figure 5:
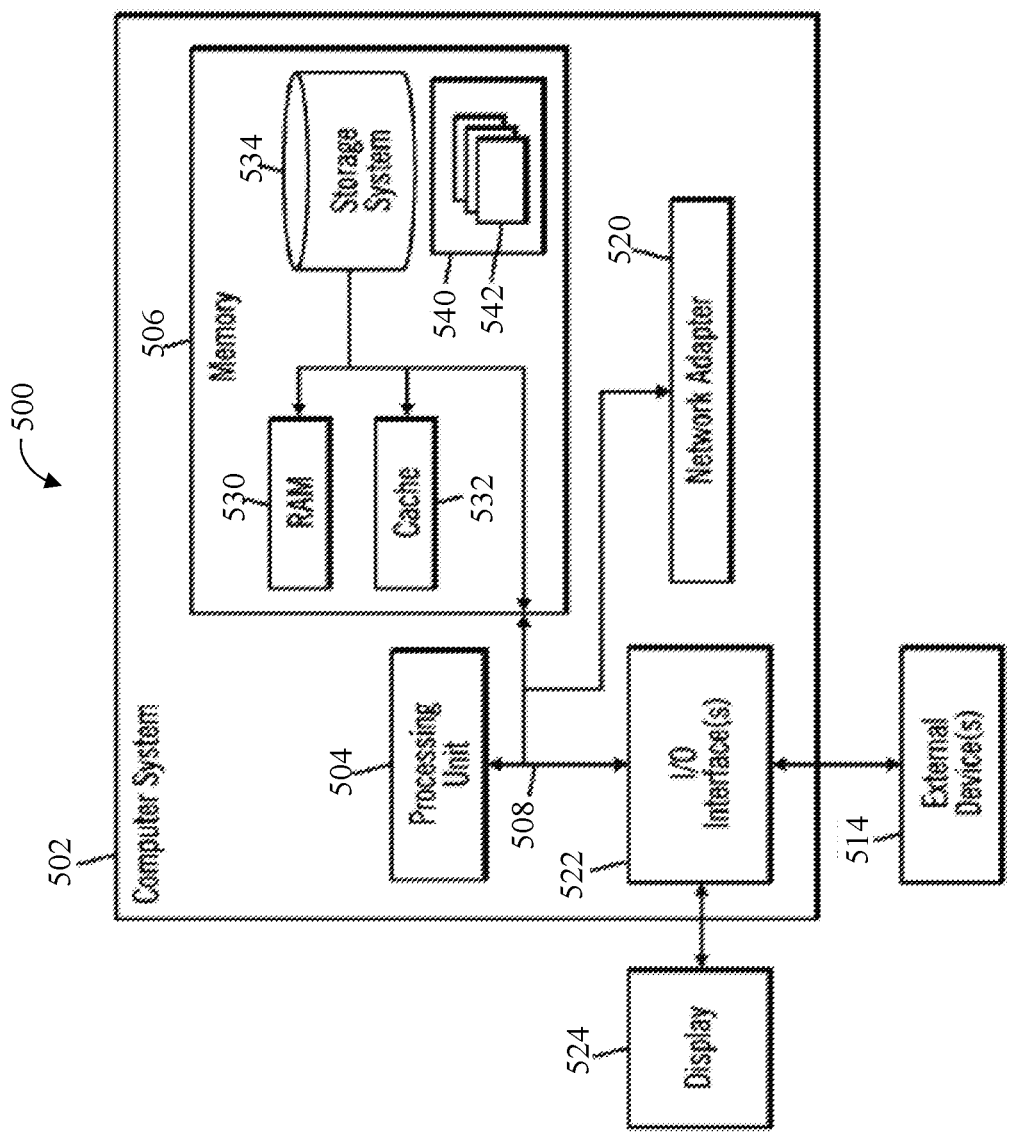
FIG. 5 is a block diagram illustrating a computer system/server of a cloud-based support system, to implement the processes described above with respect to FIGS. 1-4, in accordance with some embodiments of the present disclosure.

Aspects of the computer system 100/200 may be embodied in a computer system/server in a single location, or in at least one embodiment, may be configured in a cloud-based system sharing computing resources. With reference to FIG. 5, a block diagram is provided illustrating an example of a computer system 500 including a computer/server 502, hereinafter referred to as a host 502 in communication with a cloud based support system, to implement the system, tools, and processes described above with respect to FIGS. 1-4. Host 502 is operational with numerous other general purpose or special purpose computer system environments or configurations. Examples of well-known computer systems, environments, and/or configurations that may be suitable for use with host 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 502 may be described in the general context of computer system-executable instructions, such as program modules, being executed by a computer system. Generally, program modules may include routines, programs, objects, components, logic, data structures, and so on that perform particular tasks or implement particular abstract data types. Host 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, host 502 is shown in the form of a general-purpose computing device. The components of host 502 may include, but are not limited to, one or more processors or processing devices or units 504, e.g. hardware processors, a system memory 506, and a bus 508 that couples various system components including system memory 506 to processing device 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 502 typically includes a variety of computer system readable media. Such media may be any available media that is accessible by host 502 and it includes both volatile and non-volatile media, removable and non-removable media.

Memory 506 can include computer system readable media in the form of volatile memory, such as random access memory (RAM) 530 and/or cache memory 532. By way of example only, a storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces.

Program/utility 540, having a set (at least one) of program modules 542, may be stored in memory 506 by way of example, and not limitation, as well as an operating system, one or more application programs, other program modules, and program data. Each of the operating systems, one or more application programs, other program modules, and program data or some combination thereof, may include an implementation of a networking environment. Program modules 542 generally carry out the functions and/or methodologies of embodiments as described in FIGS. 1-4.

Host 502 may also communicate with one or more external devices 514, such as a keyboard, a pointing device, etc.; a display 524; one or more devices that enable a user to interact with host 502; and/or any devices (e.g., network card, modem, etc.) that enable host 502 to communicate with one or more other computing devices. Such communication can occur via Input/Output (I/O) interface(s) 522. Still yet, host 502 can communicate with one or more networks such as a local area network (LAN), a general wide area network (WAN), and/or a public network (e.g., the Internet) via network adapter 520. As depicted, network adapter 520 communicates with the other components of host 502 via bus 508. In at least one embodiment, a plurality of nodes of a distributed file system (not shown) is in communication with the host 502 via the I/O interface 522 or via the network adapter 520. It should be understood that although not shown, other hardware and/or software components could be used in conjunction with host 502. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 506, including RAM 530, cache memory 532, and storage system 534, such as a removable storage drive and a hard disk installed in a hard disk drive.

Computer programs (also called computer control logic) are stored in memory 506. Computer programs may also be received via a communication interface, such as network adapter 520. Such computer programs, when run, enable the computer system to perform the features of the present embodiments as discussed herein. In particular, the computer programs, when run, enable the processing device 504 to perform the features of the computer system 500. As such, computer programs may represent controllers of the computer system 500.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In at least one embodiment, host 502 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a state of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
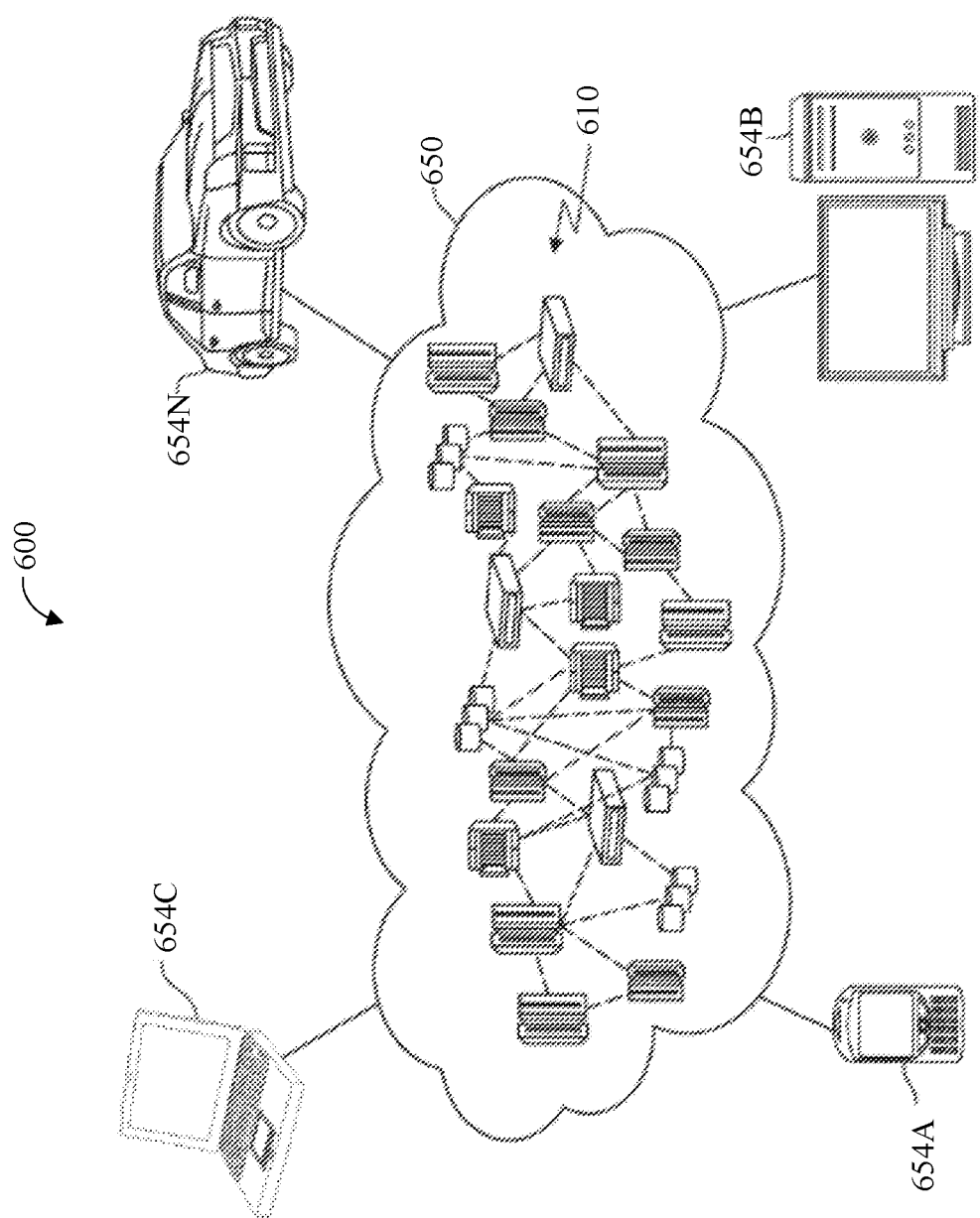
FIG. 6 is a schematic diagram illustrating a cloud computer environment, in accordance with some embodiments of the present disclosure.

Referring now to FIG. 6, a schematic diagram is provided illustrating an example cloud computing network 600. As shown, cloud computing network 600 includes a cloud computing environment 650 having one or more cloud computing nodes 610 with which local computing devices used by cloud consumers may communicate. Examples of these local computing devices include, but are not limited to, personal digital assistant (PDA) or cellular telephone 654A, desktop computer 654B, laptop computer 654C, and/or automobile computer system 654N. Individual nodes within nodes 610 may further communicate with one another. They may be grouped (not shown) physically or virtually, in one or more networks, such as Private, Community, Public, or Hybrid clouds as described hereinabove, or a combination thereof. This allows the cloud computing network 600 to offer infrastructure, platforms and/or software as services for which a cloud consumer does not need to maintain resources on a local computing device. It is understood that the types of computing devices 654A-N shown in FIG. 6 are intended to be illustrative only and that the cloud computing environment 650 can communicate with any type of computerized device over any type of network and/or network addressable connection (e.g., using a web browser).

Figure 7:
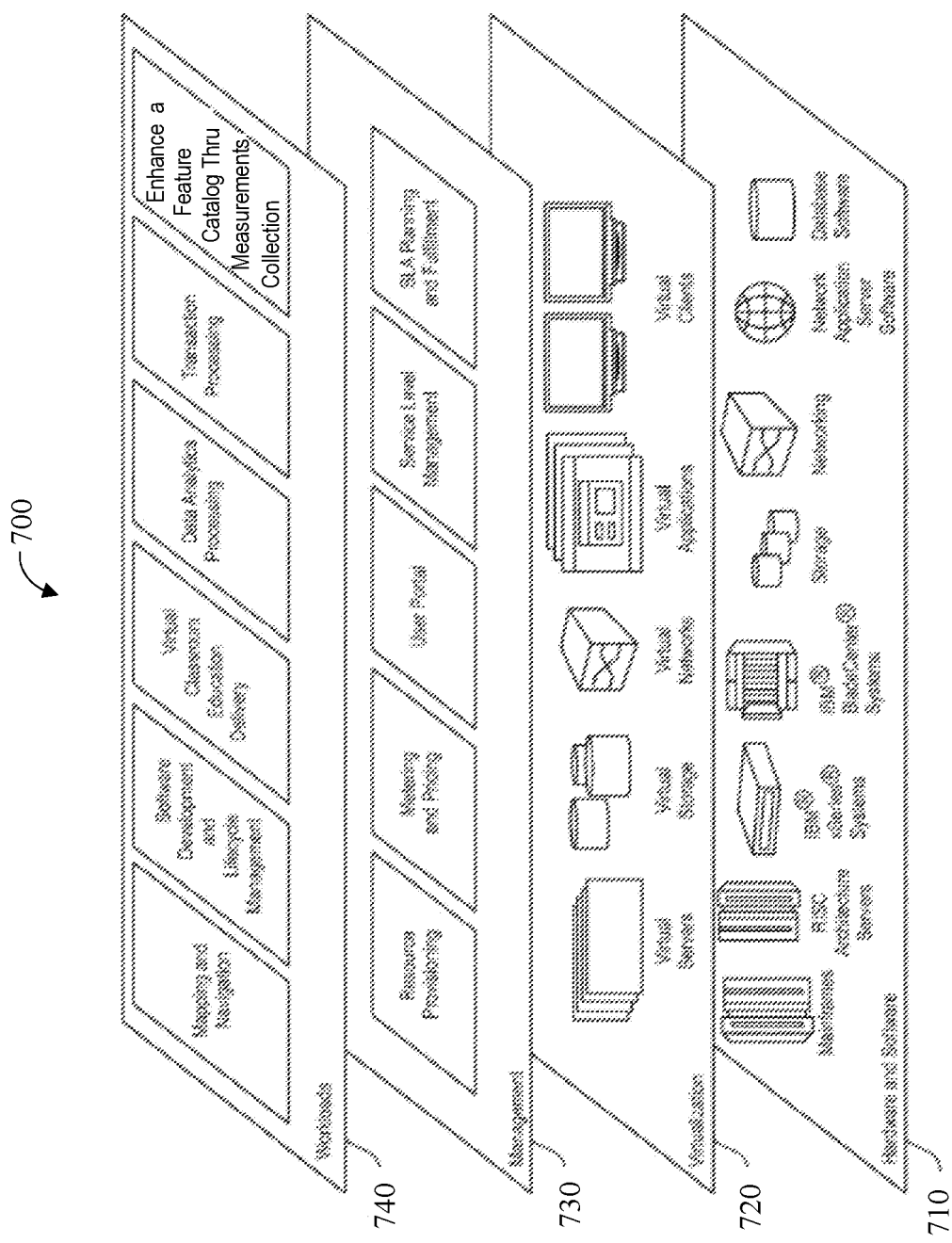
FIG. 7 is a block diagram illustrating a set of functional abstraction model layers provided by the cloud computing environment, in accordance with some embodiments of the present disclosure.

Referring now to FIG. 7, a set of functional abstraction layers 700 provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer 710, virtualization layer 720, management layer 730, and workload layer 740.

The hardware and software layer 710 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 720 provides an abstraction layer from which the following examples of virtual entities may be provided: virtual servers; virtual storage; virtual networks, including virtual private networks; virtual applications and operating systems; and virtual clients.

In one example, management layer 730 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and generating an enhanced feature catalog for a predictive model, and, more specifically, for capturing training data lineage metadata to determine the features of the training data, and using model design time measurements, model design time metadata, and runtime metrics associated with the predictive model, and correlating the captured data and metadata with the features in the feature catalog to expeditiously identify the relevant features of the predictive model.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
a processing device and a memory device operably coupled to the processing device; and
a data storage system communicatively coupled to the processing device and the memory device, the data storage system configured to maintain predictive model training data therein, the processing device is configured to implement a modeler, the modeler configured to build a predictive model from at least a portion of the predictive model training data, wherein the processing device is further configured to:
capture lineage metadata for the predictive model training data;
identify, subject to the capture, a plurality of features collected from the predictive model training data;
populate a feature catalog with the identified plurality of features;
execute one or more analyses on the predictive model to capture one or more predictive model runtime measurements;
feed-back the one or more predictive model runtime measurements to the plurality of features;
correlate, subject to the feed-back, the one or more captured predictive model runtime measurements to the plurality of features; and
automatically, subject to the correlation, define, modify, and update the features in the feature catalog.

2. The system of claim 1, wherein the processing device is further configured to:
identify the predictive model training data used to build the predictive model from the captured lineage metadata.

3. The system of claim 1, wherein the processing device is further configured to:
determine a runtime quality score for each feature of the plurality of features based on respective predictive model runtime measurements; and
retain those one or more features of the plurality of features within the feature catalog having a runtime quality score meeting or exceeding a predetermined threshold.

4. The system of claim 3, wherein the processing device is further configured to:
correlate each feature of the plurality of features with predictions generated by the predictive model; and
determine an impact of each feature of the plurality features on the predictive model predictions for different portions of a data domain of the predictive model training data.

5. The system of claim 1, wherein the processing device is further configured to:
identify one or more features of the plurality of features introducing indirect biases in the predictive model; and
capture one or more relationships between each feature of the plurality of features and determine one or more of overlapping features and gaps between features.

6. The system of claim 1, wherein the processing device is further configured to:
determine an accuracy measurement of the predictive model and correlate the accuracy measurement with each feature of the plurality of features.

7. The system of claim 1, wherein the processing device is further configured to:
capture, from the predictive model, predictive model design time measurements; and
capture predictive model design time metadata to be used to facilitate improvements in efficiency and effectiveness of predictive model building.

8. A computer program product comprising:
one or more computer readable storage media; and
program instructions collectively stored on the one or more computer-readable storage media, the program instructions comprising:
program instructions to build a predictive model from at least a portion of predictive model training data;
program instructions to capture lineage metadata for the predictive model training data;
program instructions to identify, subject to the capture, a plurality of features collected from the predictive model training data;
program instructions to populate a feature catalog with the identified plurality of features;
program instructions to execute one or more analyses on the predictive model to capture one or more predictive model runtime measurements;
program instructions to feed-back the one or more predictive model runtime measurements to the plurality of features;
program instructions to correlate, subject to the feed-back, the one or more captured predictive model runtime measurements to the plurality of features; and
program instructions to automatically, subject to the correlation, define, modify, and update the features in the feature catalog.

9. The computer program product of claim 8, further comprising:
program instructions to identify the predictive model training data used to build the predictive model from the captured lineage metadata.

10. The computer program product of claim 8, further comprising:
program instructions to determine a runtime quality score for each feature of the plurality of features based on respective predictive model runtime measurements; and
program instructions to retain those one or more features of the plurality of features within the feature catalog having a runtime quality score meeting or exceeding a predetermined threshold.

11. The computer program product of claim 10, further comprising:
program instructions to correlate each feature of the plurality of features with predictions generated by the predictive model; and
program instructions to determine an impact of each feature of the plurality features on the predictive model predictions for different portions of a data domain of the predictive model training data.

12. The computer program product of claim 8, further comprising:
program instructions to identify features of the plurality of features introducing indirect biases in the predictive model; and
program instructions to capture one or more relationships between each feature of the plurality of features and determine one or more of overlapping features and gaps between features.

13. The computer program product of claim 8, further comprising:
program instructions to determine an accuracy measurement of the predictive model and correlate the accuracy measurement with each feature of the plurality of features;
program instructions to capture, from the predictive model, predictive model design time measurements; and
program instructions to capture predictive model design time metadata to be used to facilitate improvements in efficiency and effectiveness of predictive model building.

14. A computer-implemented method comprising:
building a predictive model from at least a portion of predictive model training data;
capturing lineage metadata for the predictive model training data;
identifying, subject to the capture, a plurality of features collected from the predictive model training data;
populating a feature catalog with the identified plurality of features;
executing one or more analyses on the predictive model to capture one or more predictive model runtime measurements;
feeding-back the one or more predictive model runtime measurements to the plurality of features;
correlating, subject to the one or more analyses, the one or more captured predictive model runtime measurements to the plurality of features; and
automatically, subject to the correlation, defining, modifying, and updating the features in the feature catalog.

15. The method of claim 14, wherein capturing the lineage metadata for the predictive model training data comprises:
identifying the predictive model training data used to build the predictive model from the captured lineage metadata.

16. The method of claim 14, wherein determining the one or more features of the plurality of features to remain within the feature catalog comprises:
determining a runtime quality score for each feature of the plurality of features based on respective predictive model runtime measurements; and
retaining those one or more features of the plurality of features within the feature catalog having a runtime quality score meeting or exceeding a predetermined threshold.

17. The method of claim 16, wherein determining the runtime quality score for each feature of the plurality of features comprises:
correlating each feature of the plurality of features with predictions generated by the predictive model; and
determining an impact of each feature of the plurality features on the predictive model predictions for different portions of a data domain of the predictive model training data.

18. The method of claim 14, wherein executing the one or more analyses on the predictive model further comprises:
identifying features of the plurality of features introducing indirect biases in the predictive model; and
capturing one or more relationships between each feature of the plurality of features and determine one or more of overlapping features and gaps between features.

19. The method of claim 14, wherein executing the one or more analyses on the predictive model further comprises:
determining an accuracy measurement of the predictive model; and
correlating the accuracy measurement with each feature of the plurality of features.

20. The method of claim 14, further comprising:
capturing, from the predictive model, predictive model design time measurements; and
capturing predictive model design time metadata to be used to facilitate improvements in efficiency and effectiveness of predictive model building.

* * * * *